(12) United States Patent
Villarroel et al.

(10) Patent No.: US 9,327,618 B2
(45) Date of Patent: May 3, 2016

(54) HARMONIC DRIVE DISC RECLINER FOR AUTOMOTIVE VEHICLE SEAT

(75) Inventors: Randolph P Villarroel, Brampton (CA); Xiao J Wei, Canton, MI (US); Omar D Tame, West Bloomfield, MI (US)

(73) Assignee: Magna Seating Inc, Aurora Ontario (CA)

( * ) Notice: Subject to any disclaimer, the term of this patent is extended or adjusted under 35 U.S.C. 154(b) by 88 days.

(21) Appl. No.: 14/123,309

(22) PCT Filed: May 31, 2012

(86) PCT No.: PCT/CA2012/000513
§ 371 (c)(1),
(2), (4) Date: May 2, 2014

(87) PCT Pub. No.: WO2012/162802
PCT Pub. Date: Dec. 6, 2012

(65) Prior Publication Data
US 2014/0232159 A1    Aug. 21, 2014

Related U.S. Application Data

(60) Provisional application No. 61/491,963, filed on Jun. 1, 2011, provisional application No. 61/522,898, filed on Aug. 12, 2011.

(51) Int. Cl.
*B60N 2/225* (2006.01)
*F16H 49/00* (2006.01)

(52) U.S. Cl.
CPC ............ *B60N 2/2252* (2013.01); *F16H 49/001* (2013.01)

(58) Field of Classification Search
CPC ............................ B60N 2/2252; F16H 49/001
USPC ............................................. 297/354.12, 362
See application file for complete search history.

(56) References Cited

U.S. PATENT DOCUMENTS

| | | | | |
|---|---|---|---|---|
| 3,161,081 A | * | 12/1964 | Musser | .......................... 74/640 |
| 3,214,999 A | | 11/1965 | Lapp | |
| 4,200,333 A | | 4/1980 | Cremer et al. | |
| 4,509,904 A | * | 4/1985 | MacAskill et al. | ........... 417/568 |
| 4,574,659 A | * | 3/1986 | Arndt | ................................ 475/5 |
| 4,598,947 A | | 7/1986 | Fourrey et al. | |
| 4,641,887 A | | 2/1987 | Klueting | |

(Continued)

FOREIGN PATENT DOCUMENTS

| | | |
|---|---|---|
| CA | 1228791 | 11/1987 |
| DE | 10134355 | 1/2003 |
| EP | 1013500 | 6/2000 |

(Continued)

*Primary Examiner* — David R Dunn
*Assistant Examiner* — Timothy J Brindley
(74) *Attorney, Agent, or Firm* — Miller Canfield

(57) ABSTRACT

A disc recliner for a seat assembly includes a fixed plate secured to a seat cushion and a rotatable plate secured to a seat back. Each of the fixed and rotatable plates has a plurality of teeth, the number of teeth not being equal. A flex spline has a plurality of teeth, the number of teeth being equal to the number of teeth on the fixed plate. A wave generator causes a portion of the teeth on the flex spline to meshingly engage with the teeth on the fixed and rotatable plates. Rotation of the wave generator causes the teeth on the flex spline which meshingly engage with the teeth on the fixed and rotatable plates to change, thereby causing the rotatable plate to rotate relative to the fixed plate, which in turn causes the seat back to pivot relative to the seat cushion.

10 Claims, 14 Drawing Sheets

(56) References Cited

U.S. PATENT DOCUMENTS

| | | |
|---|---|---|
| 5,462,498 A | 10/1995 | Lindblad |
| 6,158,811 A | 12/2000 | Hofschulte et al. |
| 6,231,468 B1 * | 5/2001 | Bajulaz .................. 475/166 |
| 2010/0176640 A1 | 7/2010 | Hayashi et al. |

FOREIGN PATENT DOCUMENTS

| | | |
|---|---|---|
| GB | 2423701 | 9/2006 |
| WO | 0226522 | 4/2002 |
| WO | 2009091980 | 7/2009 |
| WO | 2010012101 | 2/2010 |

* cited by examiner

HARMONIC DRIVE DISC RECLINER FOR AUTOMOTIVE VEHICLE SEAT

CROSS-REFERENCE TO RELATED APPLICATIONS

This application claims priority to and all the benefits of U.S. Provisional Application No. 61/491,963 filed on Jun. 1, 2011 and entitled "Harmonic Drive Disc Recliner For Automotive Vehicle Seat" and U.S. Provisional Application No. 61/522,898 filed on Aug. 12, 2011 and entitled "Seat Recliner With Harmonic Drive And Bearing Cage."

BACKGROUND OF THE INVENTION

1. Field of the Invention

The present invention relates to a vehicle seat assembly. More particularly, the present invention relates to a harmonic drive disc recliner operatively coupling a seat back and seat cushion.

2. Description of Related Art

Automotive vehicles typically include one or more seat assemblies having a seat cushion and a seat back for supporting passengers above a vehicle floor. The seat assembly is commonly mounted directly to the vehicle floor or, more commonly, the seat assembly is operatively coupled to the floor by a seat track assembly for providing fore and aft sliding adjustment of the seat assembly for passenger comfort. The seat back is typically operatively coupled to the seat cushion by a recliner assembly for providing pivotal movement relative to the seat cushion.

For some vehicles, particularly those for the luxury market, the recliner assembly is electrically powered. A typical power seat recliner assembly includes an electric drive motor that meshes with a series of reduction gears. Rotation of the drive motor adjusts the recline angle of the seat back relative to the seat cushion. Forward and rearward reclining movement of the seat back is provided through reversing the direction of rotation of the drive motor.

It is desirable that an improved recliner assembly be compact, lightweight and low-cost. It is also desirable that an improved recliner assembly reduce any gear backlash or "chuck." "Chuck" refers to any imperfection or play within the recliner assembly that allows movement of the seat back while the recliner assembly is in a locked condition. Further, it is desirable that an improved recliner assembly allows for a high gear ratio which allows for a smaller drive motor and less drive motor gear reduction.

SUMMARY OF THE INVENTION

According to one aspect of the invention, a seat assembly for an automotive vehicle includes a harmonic drive disc recliner operatively coupling a seat back to a seat cushion to allow pivotal movement of the seat back relative to the seat cushion. The disc recliner includes a fixed plate secured to the seat cushion and a rotatable plate secured to the seat back and rotatably coupled to the fixed plate. The fixed and rotatable plates each have a plurality of teeth disposed therearound that extend radially inward. The number of teeth on the fixed plate does not equal the number of teeth on the rotatable plate. A flex spline is disposed between the fixed and rotatable plates and includes a plurality of teeth that extend radially outward. The flex spline has the same number of teeth as the fixed plate. A wave generator is disposed within the flex spline and has an outer profile with lobes that cause the teeth on the flex spline to meshingly engage with the teeth on the fixed and rotatable plates in distinct regions corresponding with the lobes. As the wave generator rotates, the regions where the teeth on the flex spline meshingly engage with the teeth on the fixed and rotatable plates change and simultaneously the teeth on the flex spline urge the teeth on the rotatable plate to align with the teeth on the fixed plate in those regions, thereby causing rotation of the rotatable plate relative to the fixed plate, which in turn causes the seat back to pivot relative to the seat cushion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
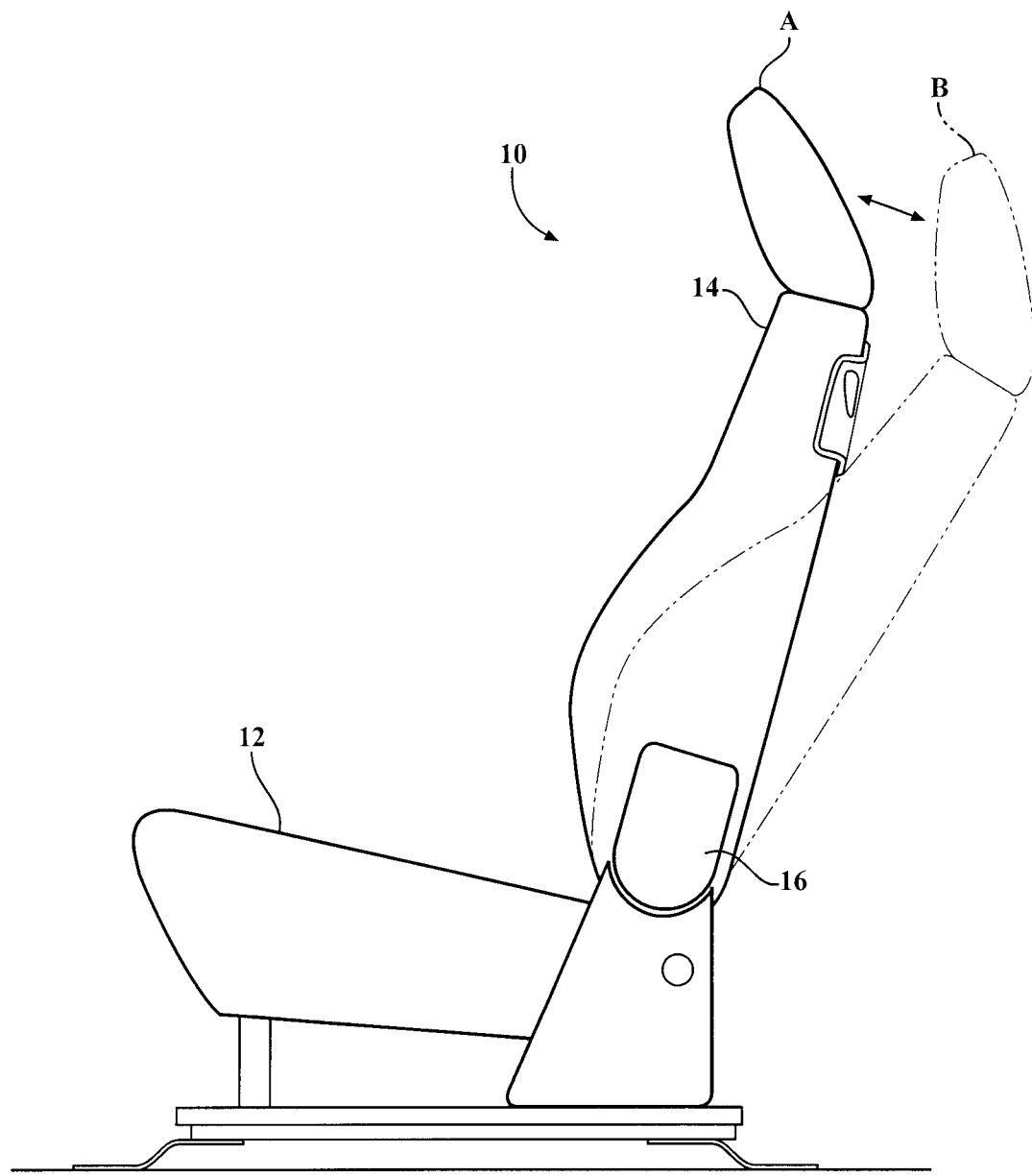
FIG. 1 is a side view of a vehicle seat assembly including a seat back operatively coupled to a seat cushion with a recliner assembly having a harmonic drive disc recliner.
Figure 2:
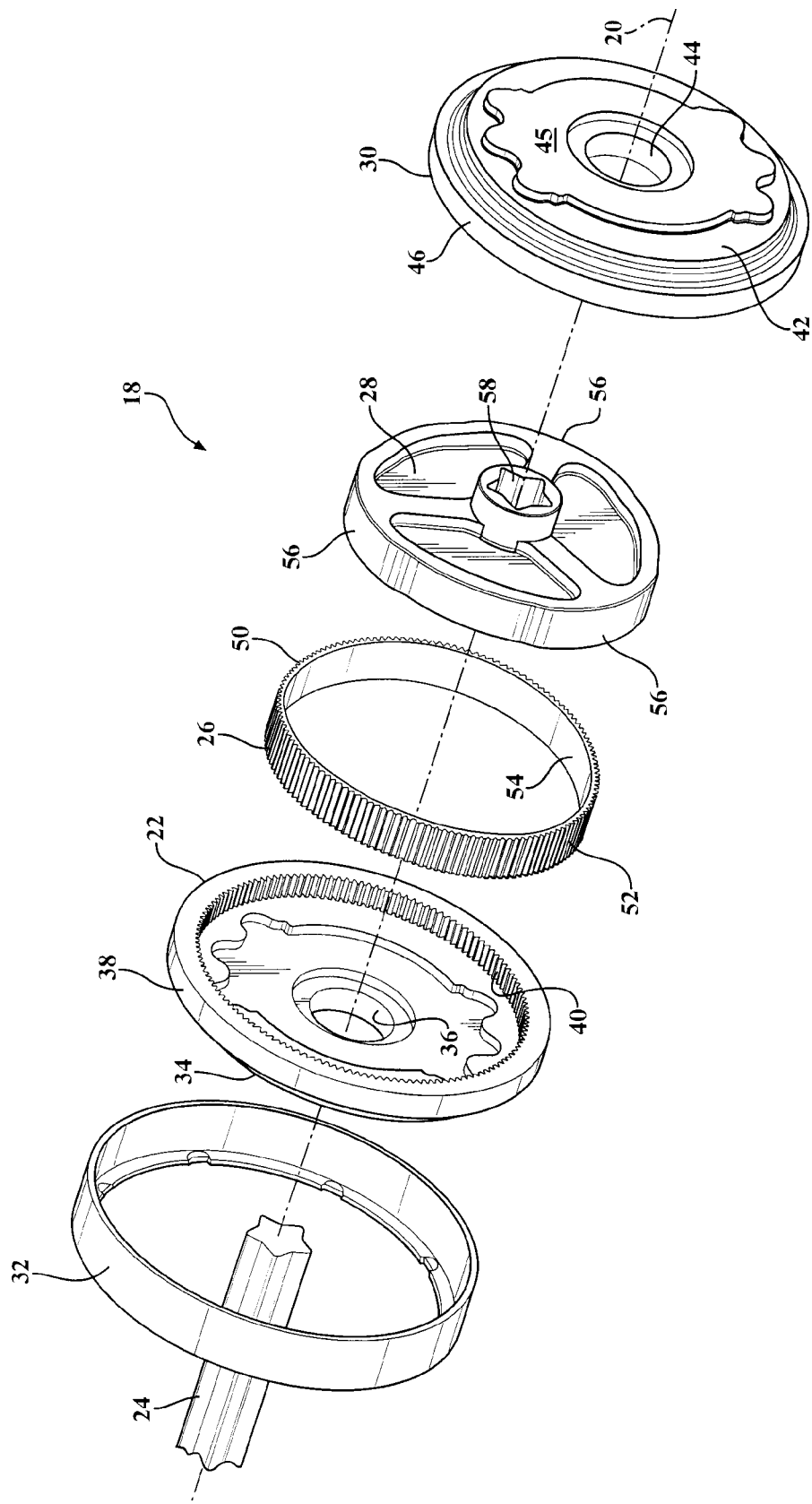
FIG. 2 is an exploded perspective view of a harmonic drive disc recliner according to a first embodiment of the invention.
Figure 3:
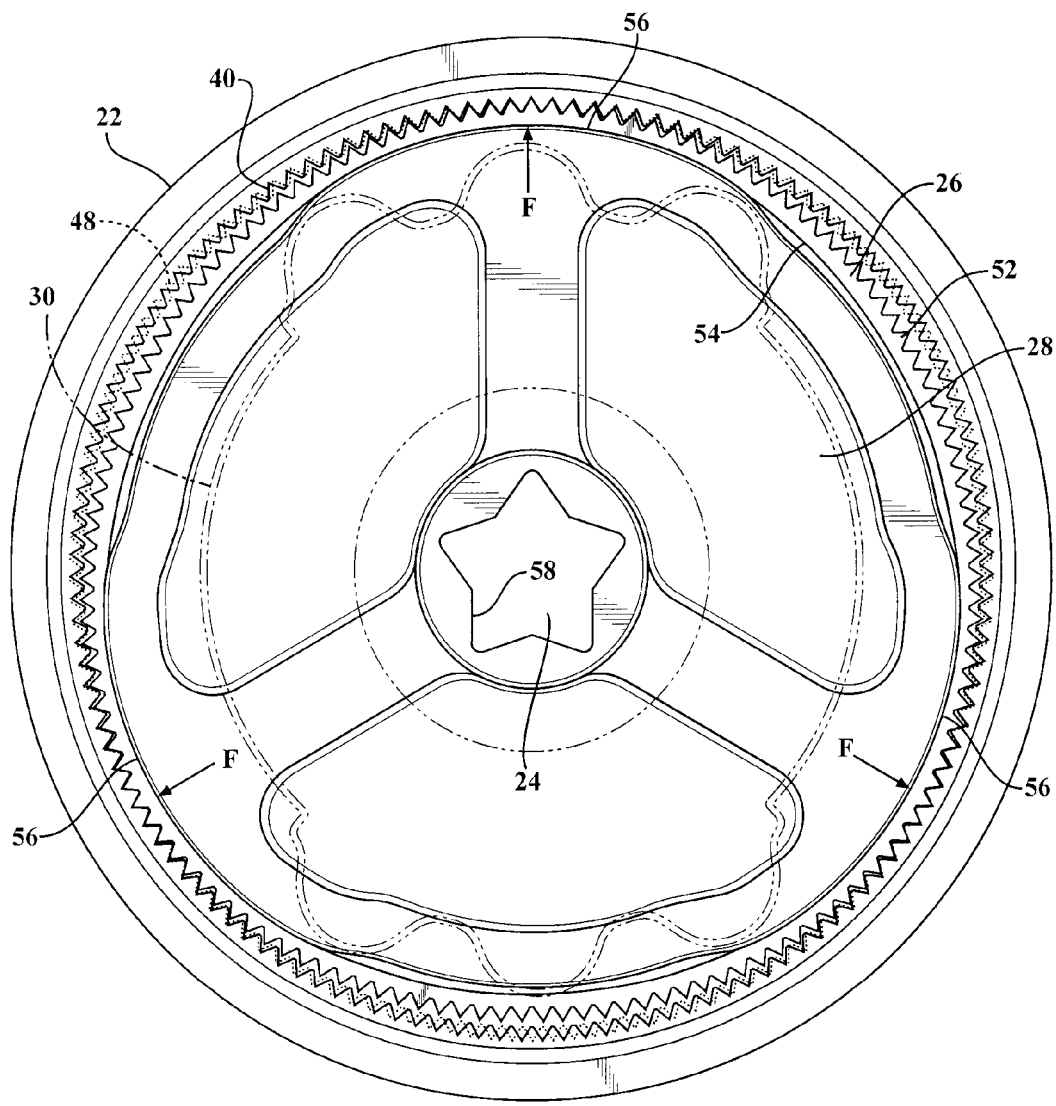
FIG. 3 is a side view of the disc recliner shown in FIG. 2 illustrating a wave generator causing meshing engagement between a flex spline, fixed plate, and rotatable plate.
Figure 4:
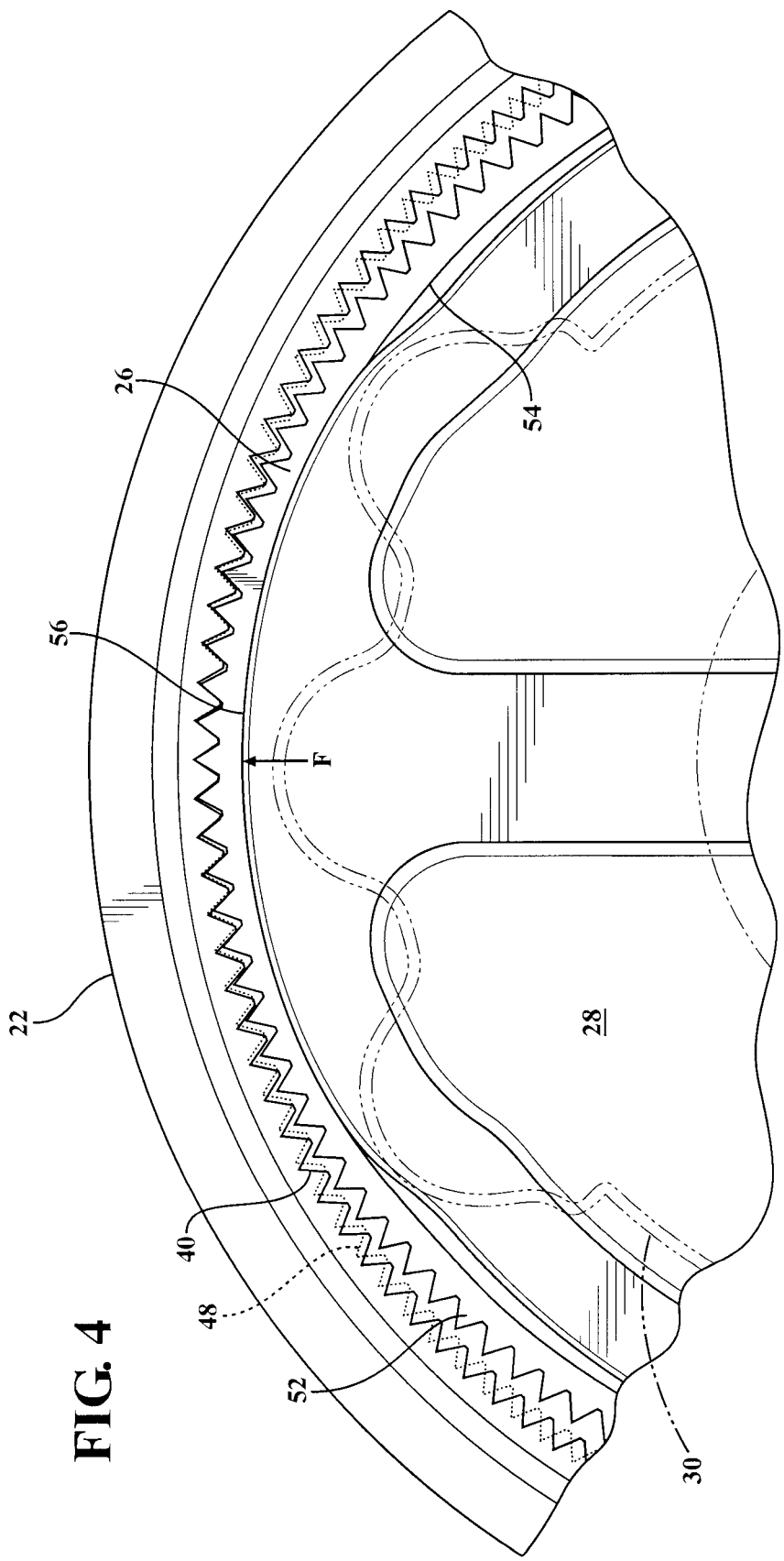
FIG. 4 is a close-up side view of the disc recliner shown in FIG. 3.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively coupled by a recliner assembly 16 to the seat cushion 12. The recliner assembly 16 includes a pair of spaced apart and synchronized disc recliners 18, only one of which is shown.

Referring to FIGS. 1 through 4, the disc recliners 18 allow for pivotal or angular adjustment of the seat back 14 relative to the seat cushion 12 about a pivot axis 20 that extends laterally or in an axial direction. The seat back 14 is adjustable between an upright seating position, shown at A, and a plurality of reclined positions disposed rearwardly of the upright seating position A, one of which is shown at B. Only one of the disc recliners 18 will be described in detail, however, it is contemplated that both of the disc recliners 18 may have generally the same construction. The disc recliner 18 generally includes a fixed plate 22, an input shaft 24, a flex spline 26, a wave generator 28, and a rotatable plate 30. In the current embodiment, the fixed plate 22 is adapted to be mounted to the seat cushion 12 and the rotatable plate 30 is adapted to be mounted to the seat back 14. The fixed plate 22 and the rotatable plate 30 are held together by a retaining ring 32 in a manner well known in the art such that the rotatable plate 30 can rotate about the pivot axis 20 relative to the fixed plate 22. It is understood that rotation of the rotatable plate 30 relative to the fixed plate 22 results in pivotal movement of the seat back 14 relative to the seat cushion 12.

The fixed plate 22 is circular, generally cup-shaped, and includes an end wall 34 having a first central bore 36 extending therethrough in the axial direction. When the disc recliner 18 is assembled, the first central bore 36 is coaxial with the pivot axis 20. An outer side of the end wall 34 is adapted to be fixedly secured to the seat cushion 12 by any suitable means. A side wall 38 protrudes from the end wall 34 in the axial direction and extends circumferentially around the fixed plate 22 to define an inner surface. A first plurality of teeth 40 is disposed around the inner surface of the side wall 38. The teeth 40 extend radially inward toward the pivot axis 20.

The rotatable plate 30 is also circular, generally cup-shaped, and includes an end wall 42 having a second central bore 44 extending therethrough in the axial direction. When the disc recliner 18 is assembled, the second central bore 44 is coaxial with the pivot axis 20. An outer side 45 of the end wall 42 is adapted to be fixedly secured to the seat back 14 by any suitable means. A side wall 46 protrudes from the end wall 42 in the axial direction and extends circumferentially around the rotatable plate 30 to define an inner surface. A second plurality of teeth 48 is disposed around the inner surface of the side wall 46. The teeth 48 extend radially inward toward the pivot axis 20.

The flex spline 26 is ring-shaped and has a thin flexible wall 50. A third plurality of teeth 52 is disposed around an outside surface of the flexible wall 50. The teeth 52 extend radially outward away from the pivot axis 20. The flex spline 26 is disposed in the axial direction between the fixed plate 22 and the rotatable plate 30 such that the teeth 52 on the flex spline 26 meshingly engage with the teeth 40 on the fixed plate 22 and the teeth 48 on the rotatable plate 30, as will be described in further detail below.

The wave generator 28 is disposed circumferentially within the flex spline 26 and includes an outer profile that is adapted for engaging an inner surface 54 of the flex spline 26 thereby deforming the flex spline 26 and causing the teeth 52 on the flex spline 26 to meshingly engage with the teeth 40 on the fixed plate 22 and the teeth 48 on the rotatable plate 30 in three distinct regions. Each region where the teeth 52 on the flex spline 26 meshingly engage with the teeth 40 on the fixed plate 22 and the teeth 48 on the rotatable plate 30 corresponds with a lobe or high point on the outer profile of the wave generator 28.

In the current embodiment, the wave generator 28 is a disc-shaped cam and the outer profile includes three lobes 56 generally equally spaced apart in the circumferential direction. Thus, each lobe 56 is spaced approximately one hundred and twenty (120) degrees apart from each adjacent lobe 56. Each lobe 56 contacts the inner surface 54 of the flex spline 26 and applies a normal force F thereto, thereby deforming the shape of the flex spline 26. Rotation of the wave generator 28 causes the flex spline 26 to deform to the shape of the rotating wave generator 28. The flex spline 26 does not rotate with the wave generator 28, the reason for which is described below. The wave generator 28 also includes a third central bore 58 extending therethrough in the axial direction and which is adapted for receiving the input shaft 24. When the disc recliner 18 is assembled, the third central bore 58 is coaxial with the pivot axis 20. It is contemplated that the wave generator 28 could have more than three lobes 56 causing the teeth 52 on the flex spline 26 to meshingly engage with the teeth 40 on the fixed plate 22 and the teeth 48 on the rotatable plate 30 in more than three regions.

The input shaft 24 is coaxial with the pivot axis 20 and extends in the axial direction through the first central bore 36 of the fixed plate 22, the third central bore 58 of the wave generator 28, and the second central bore 44 of the rotatable plate 30. The input shaft 24 is rotatably driven by a motor (not shown) in a first or second direction depending on the desired direction of movement of the seat back 14. Alternatively, it is appreciated that the input shaft 24 may be manually rotated in the first or second direction without varying from the scope of the invention. The wave generator 28 is coupled to the input shaft 24 for rotation therewith. As the wave generator 28 rotates, the lobes 56 are in sliding contact with the inner surface 54 of the flex spline 26 such that rotation of the wave generator 28 creates friction between the lobes 56 and the inner surface 54. The friction, along with the normal force F, determines the amount of torque required to rotate the input shaft 24. As the wave generator 28 rotates, the teeth 52 on the flex spline 26 which meshingly engage with the teeth 40, 48 on the fixed and rotatable plates 22, 30 change. In other words, the regions where the teeth 52 on the flex spline 26 meshingly engage with the teeth 40, 48 on the fixed and rotatable plates 22, 30 change and revolve around the pivot axis 20 at the same rate as rotation of the wave generator 28.

In the current embodiment, the number of teeth 52 or tooth count on the flex spline 26 is equal to the number of teeth 40 or tooth count on the fixed plate 22. For example, the number of teeth 52 on the flex spline 26 and the number of teeth 40 on the fixed plate 22 is one hundred and eighty (180). Since the flex spline 26 and the fixed plate 22 have the same number of teeth there is no relative rotation between the flex spline 26 and the fixed plate 22 during rotation of the wave generator 28. Rather, the teeth 52 on the flex spline 26 simply engage and disengage with the teeth 40 on the fixed plate 22 as the wave generator 28 rotates, thereby causing the flex spline 26 to flex inwardly and outwardly. In contrast, the rotatable plate 30 has more teeth than the flex spline 26. In one embodiment, for example, the number of teeth 48 or tooth count on the rotatable plate 30 is one hundred and eighty-three (183). Since the rotatable plate 30 has more teeth than the flex spline 26, the rotatable plate 30 will rotate relative to the flex spline 26 during rotation of the wave generator 28. More specifically, the different number of teeth results in a misalignment between a profile of the teeth 48 on the rotatable plate 30 and a profile of the teeth 40 on the fixed plate 22. Thus, as the wave generator 28 causes the flex spline 26 to flex outwardly, the teeth 52 on the flex spline 26 push against the teeth 48 on the rotatable plate 30 to align the profile of the teeth 48 on the rotatable plate 30 with the profile of the teeth 40 on the fixed plate 22 in the regions where the teeth 52 on the flex spline 26 meshingly engage with the teeth 40, 48 on the fixed and rotatable plates 22, 30, thereby causing the rotatable plate 30 to rotate relative to the flex spline 26 and the fixed plate 22.

For every full rotation of the wave generator 28, the rotatable plate 30 will rotate a slight amount (three teeth, for example) backward relative to the flex spline 26. The reduction ratio from the input shaft 24 to the rotatable plate 30 can be calculated as:

$$\text{reduction ratio} = \frac{\text{number of teeth on flex spline} - \text{number of teeth on rotatable plate}}{\text{number of teeth on flex spline}}$$

For example, if the number of teeth 48 on the rotatable plate 30 is one hundred and eighty-three (183) and the number of teeth 52 on the flex spline 26 is one hundred and eighty (180), the reduction ratio is −0.0167. Thus, the rotatable plate 30 will rotate at $\frac{1}{60}^{th}$ the speed of the input shaft 24 and in the opposite direction. It is appreciated that the difference between the number of teeth 48 on the rotatable plate 30 and the number of teeth 52 on the flex spline 26 will depend on the number of regions in which the teeth 52 on the flex spline 26 meshingly engage with the teeth 48 on the rotatable plate 30.

Figure 5:
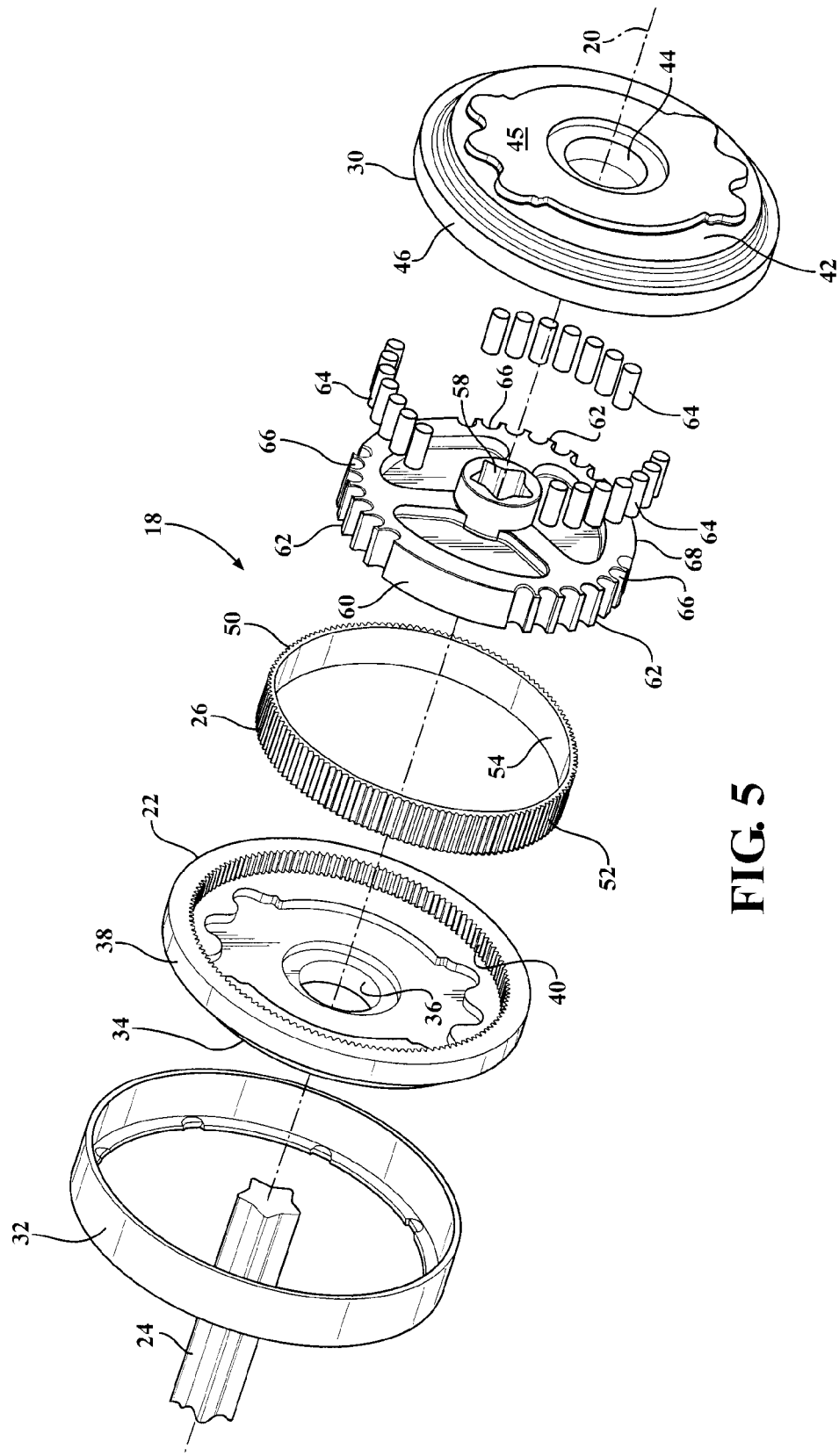
FIG. 5 is an exploded perspective view of a harmonic drive disc recliner according to a second embodiment of the invention.
Figure 6:
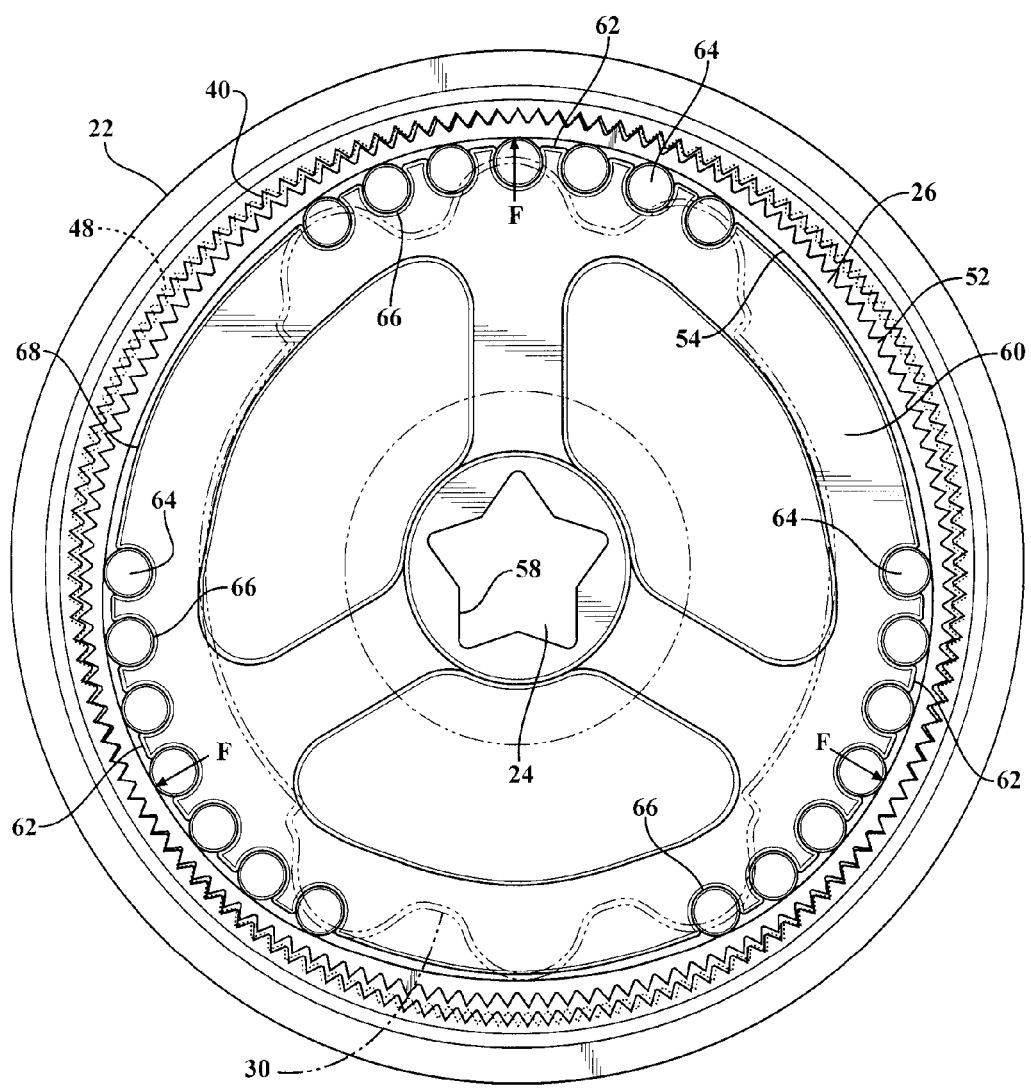
FIG. 6 is a side view of the disc recliner shown in FIG. 5 illustrating a wave generator causing meshing engagement between a flex spline, fixed plate, and rotatable plate.
Figure 7:
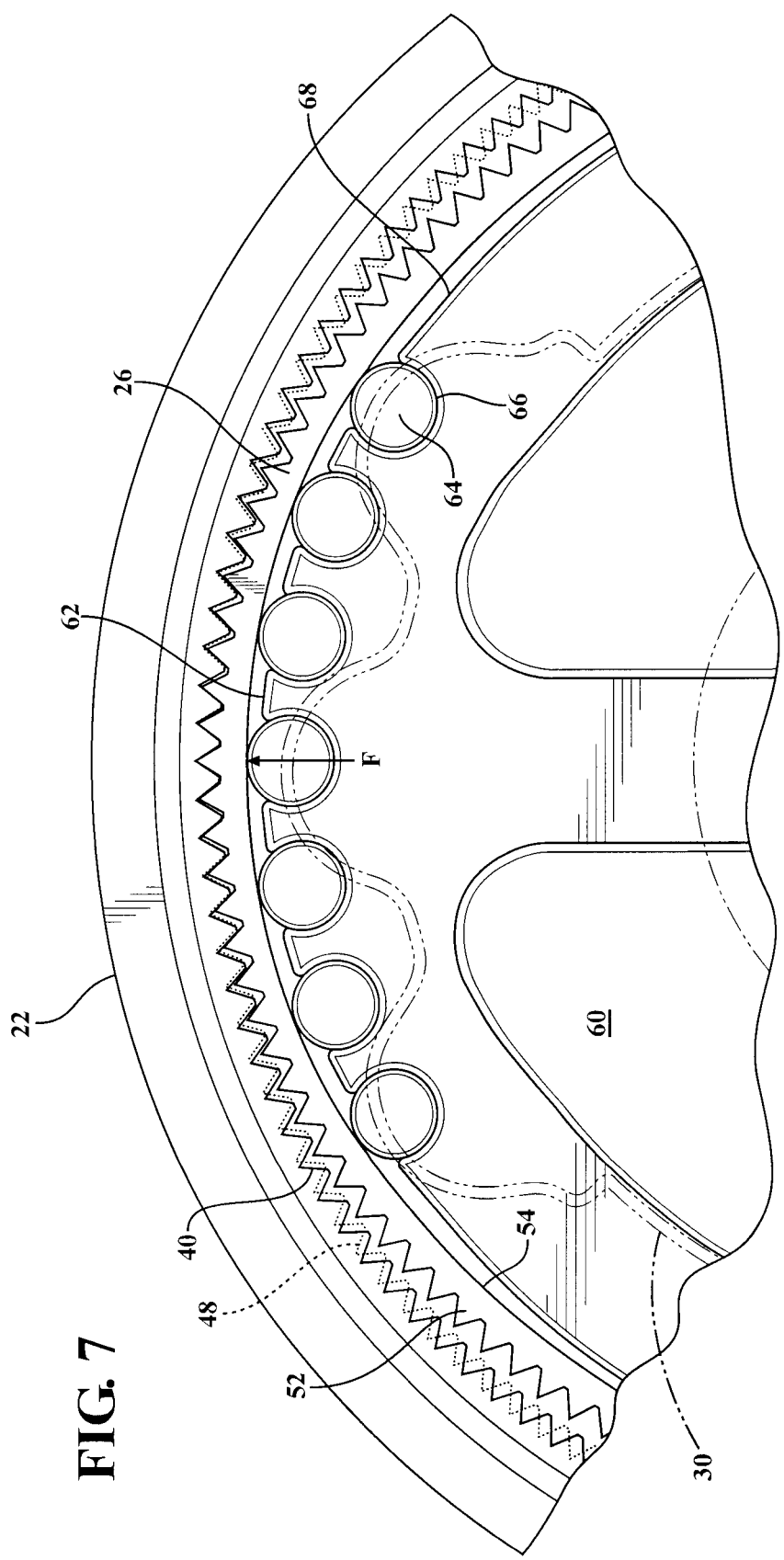
FIG. 7 is a close-up side view of the disc recliner shown in FIG. 6.
Figure 8:
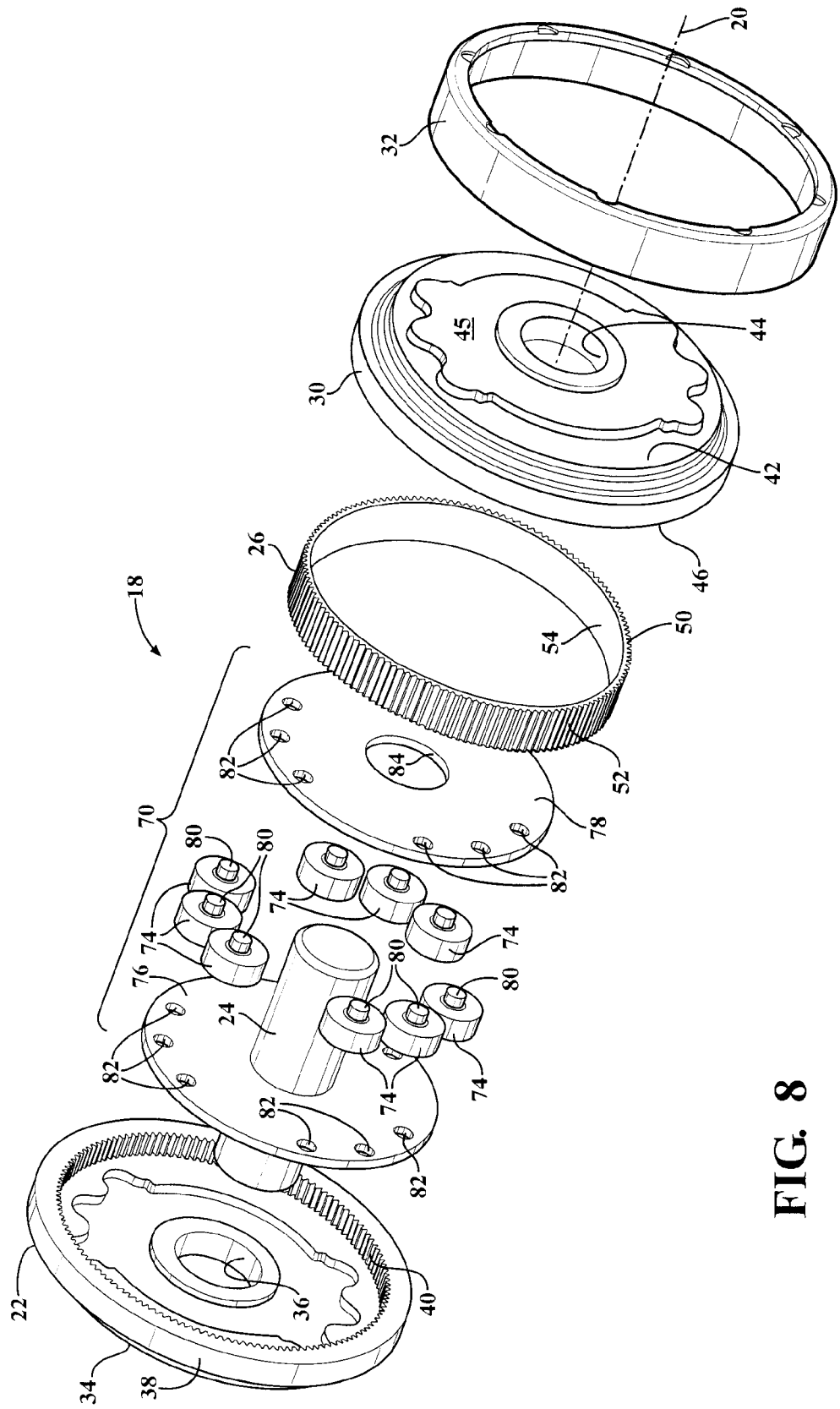
FIG. 8 is an exploded perspective view of a harmonic drive disc recliner according to a third embodiment of the invention.
Figure 9:
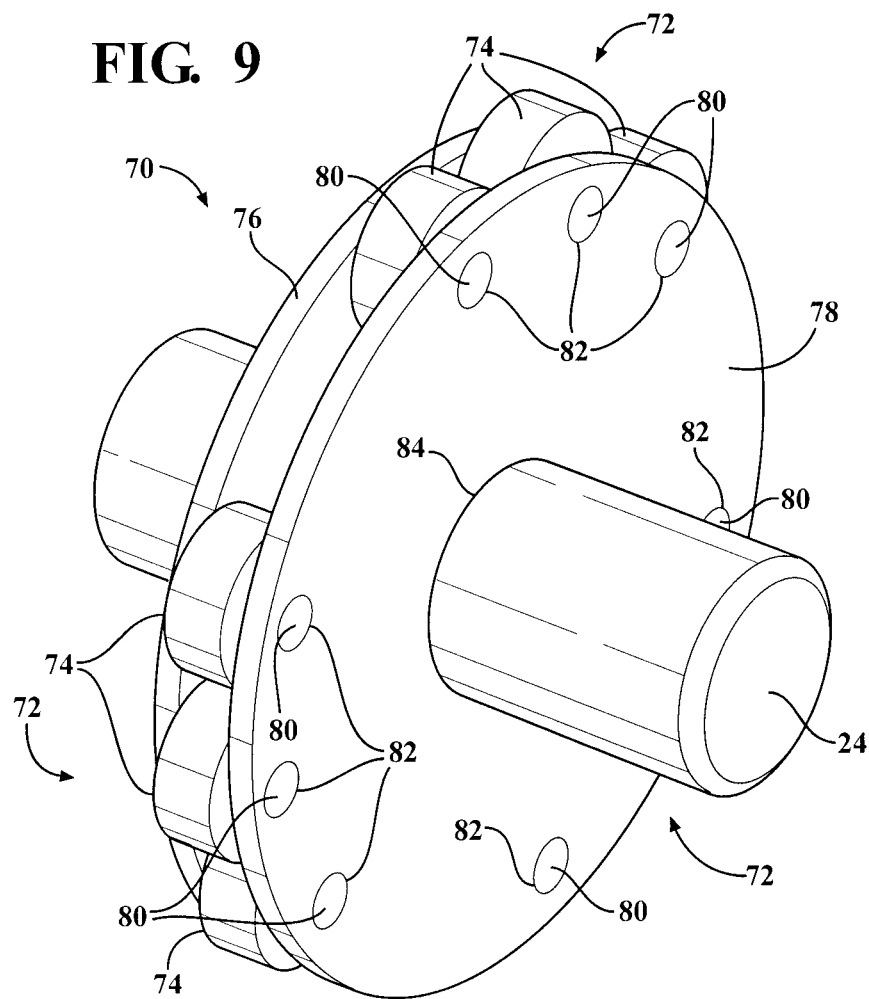
FIG. 9 is a perspective view of a wave generator from the disc recliner shown in FIG. 8.
Figure 10:
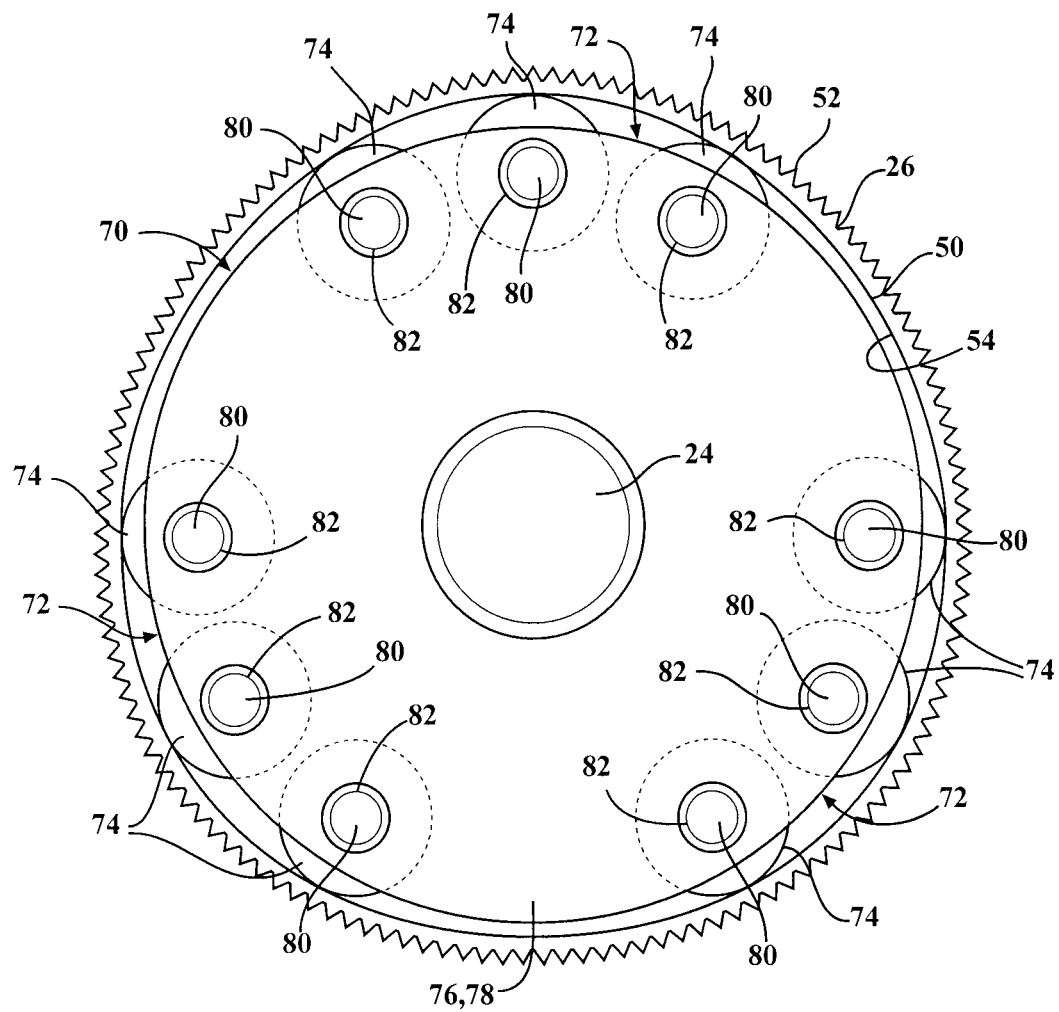
FIG. 10 is a side view of the wave generator shown in FIG. 9 in rolling contact with a flex spline.
Figure 11:
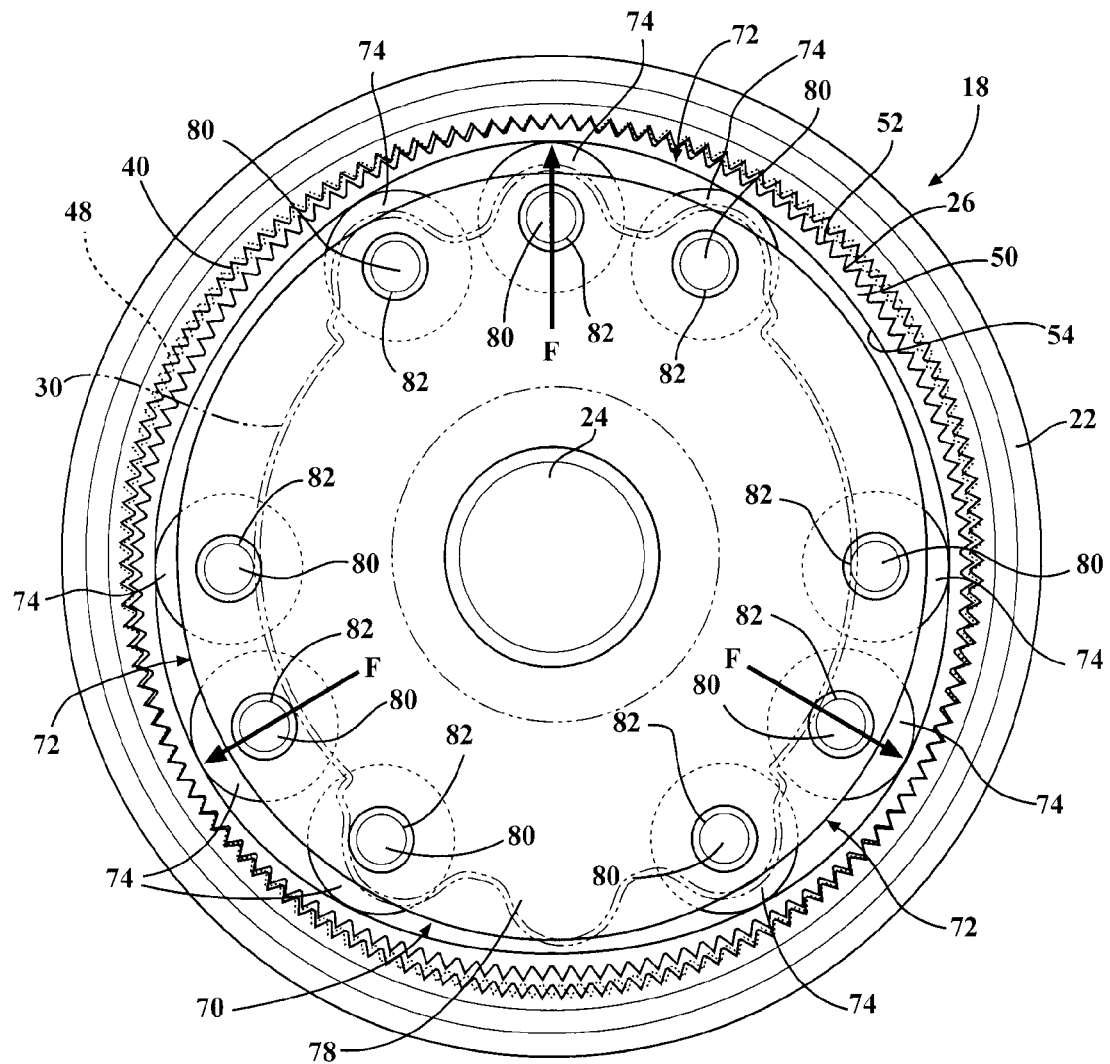
FIG. 11 is a side view of the disc recliner shown in FIG. 8 illustrating the wave generator causing meshing engagement between the flex spline, fixed plate, and rotatable plate.
Figure 12:
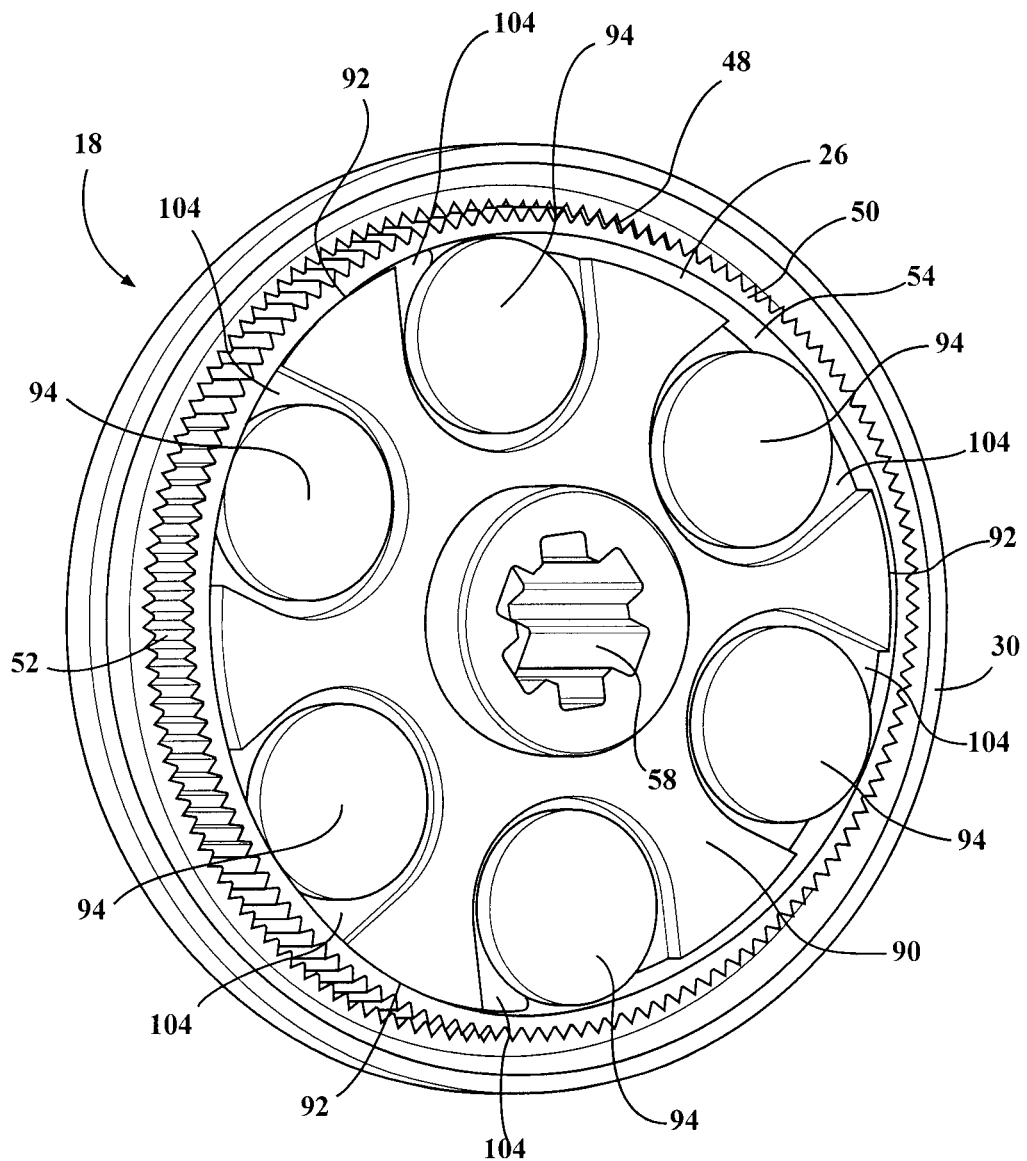
FIG. 12 is a fragmentary perspective view of a harmonic drive disc recliner according to a fourth embodiment of the invention.
Figure 13:
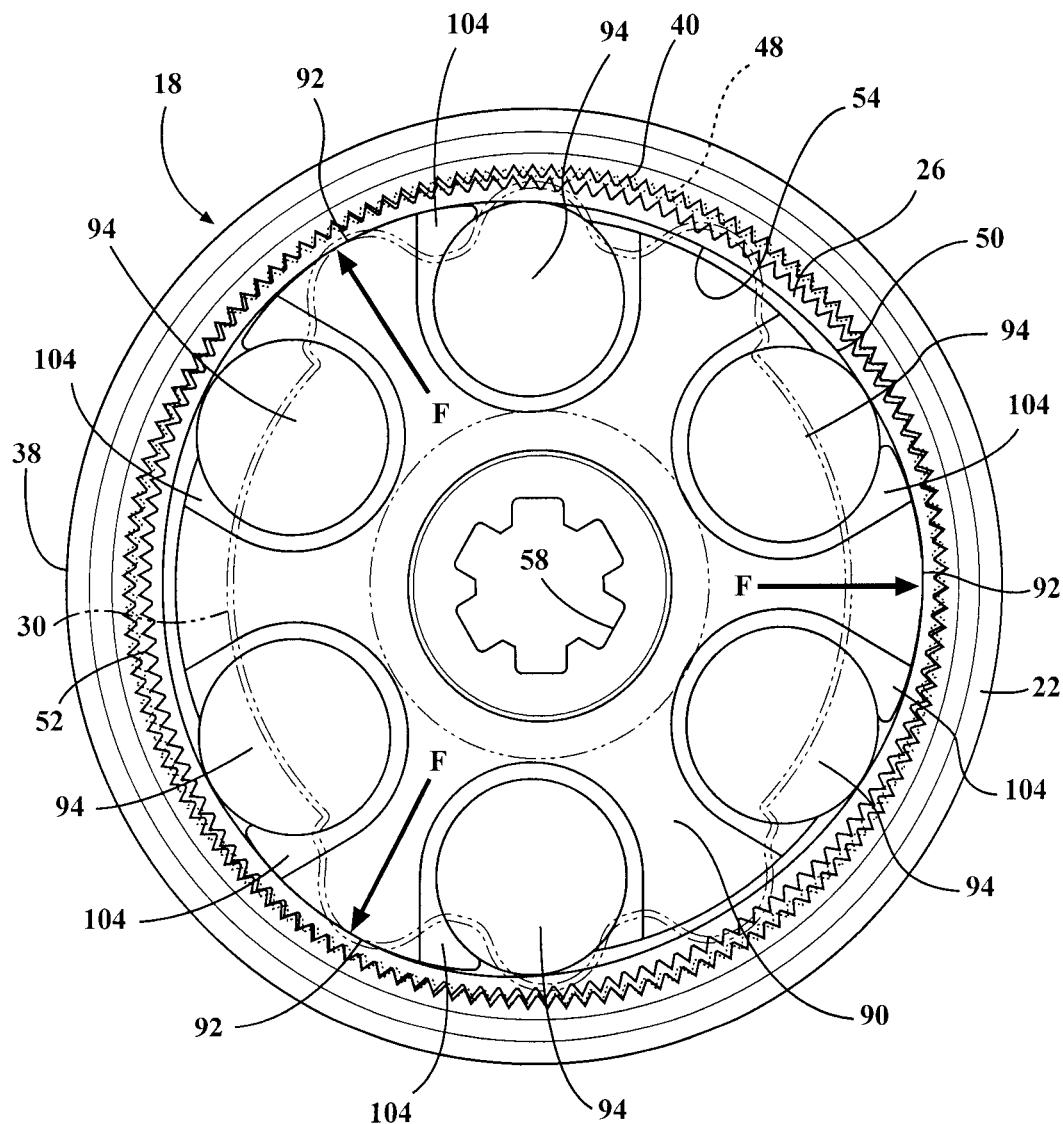
FIG. 13 is a side view of the disc recliner shown in FIG. 12 illustrating the wave generator causing meshing engagement between the flex spline, fixed plate, and rotatable plate.
Figure 14:
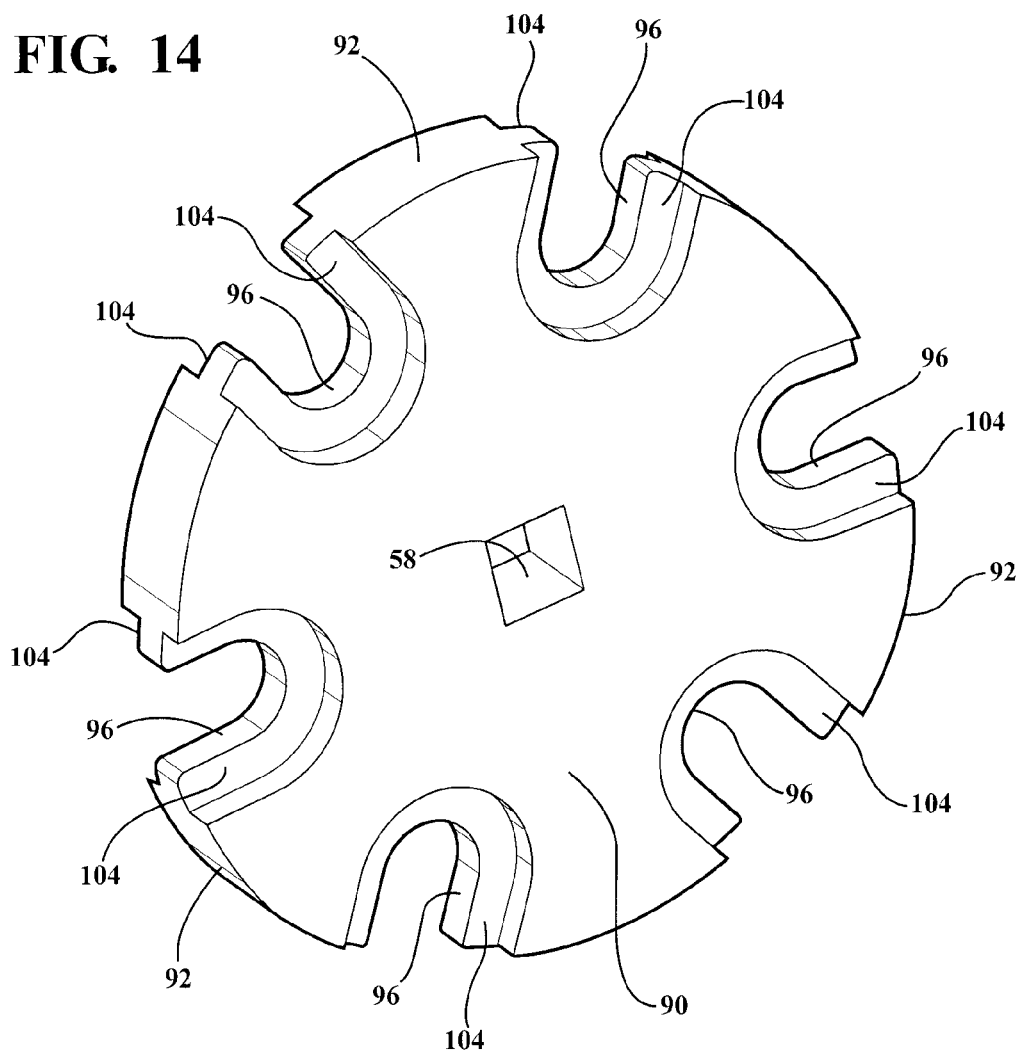
FIG. 14 is perspective view of a wave generator from the disc recliner shown in FIG. 12.
Figure 15:
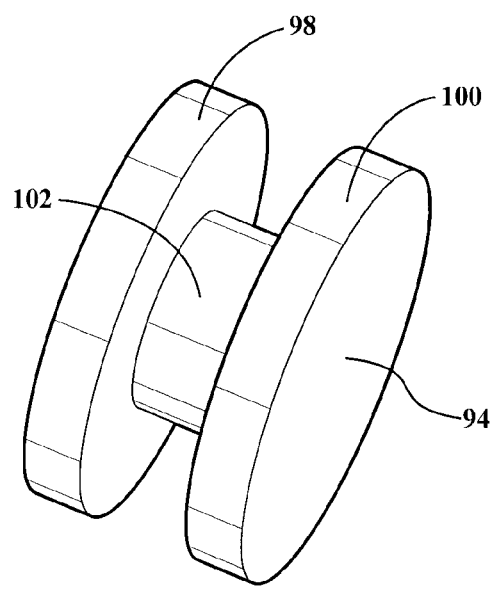
FIG. 15 is a perspective view of a roller of the wave generator from the disc recliner shown in FIG. 12.

Referring to FIGS. 5 through 7, in a second embodiment of the invention, the disc recliner 18 includes a wave generator 60 that is a disc-shaped cam having an outer profile with three lobes 62 generally equally spaced apart in the circumferential direction. Thus, each lobe 62 is spaced approximately one hundred and twenty (120) degrees apart from each adjacent lobe 62. Each lobe 62 is formed by a series of cylindrical rollers 64 set in a series of corresponding recesses 66 formed in an outer edge 68 of the wave generator 60. The rollers 64 are arranged to rotate about individual axes of rotation that extend in the axial direction and are generally parallel with the pivot axis 20. The rollers 64 contact the inner surface 54 of the flex spline 26. As the wave generator 60 rotates, the rollers 64 are in rolling contact with the inner surface 54 of the flex spline 26, thereby reducing the friction between the wave generator 60 and the flex spline 26 as compared with the first embodiment. The reduced friction lowers the torque required to rotate the input shaft 24. In the current embodiment, each lobe 62 includes seven (7) rollers 64 and seven (7) corresponding recesses 66. It is appreciated, however, that any number of rollers 64 and corresponding recesses 66 may be used without varying from the scope of the invention. It is contemplated that the rollers 64 could be spherical bearings without varying from the scope of the invention. It is also contemplated that each lobe 62 could include a single recess elongated in the circumferential direction with multiple rollers disposed in the recess, wherein each roller is mounted for rotation about a center axle extending in the axial direction that is generally parallel with the pivot axis 20.

Referring to FIGS. 8 through 11, in a third embodiment of the invention, the disc recliner 18 includes a wave generator 70 that is a disc-shaped cam having an outer profile with three lobes 72 generally equally spaced apart in the circumferential direction. Thus, each lobe 72 is spaced approximately one hundred and twenty (120) degrees apart from each adjacent lobe 72. Each lobe 72 is formed by a series of three cylindrical rollers 74 held between a first cage part 76 and a second cage part 78. Each roller 74 is rotatably mounted on a shaft 80 that extends in the axial direction and which is supported at each end by openings 82 in the first and second cage parts 76, 78. In other words, the first and second cage parts 76, 78 form a bearing cage for supporting the rollers 74 therebetween. The axis of each shaft 80 is generally parallel with the pivot axis 20. The first cage part 76 is circular and is disposed adjacent to the fixed plate 22. The second cage part 78 is also circular and includes a third central bore 84 extending therethrough in the axial direction. The input shaft 24 is fixedly secured to the first cage part 76 for rotation therewith. When the disc recliner 18 is assembled, the input shaft 24 is coaxial with the pivot axis 20 and extends from the first cage part 76 in the axial direction through the first central bore 36 in the fixed plate 22. The input shaft 24 also extends from the first cage part 76 in the axial direction through the third central bore 84 in the second cage part 78 and the second central bore 44 in the rotatable plate 30. The rollers 74 contact the inner surface 54 of the flex spline 26. As the wave generator 70 rotates, the rollers 74 are in rolling contact with the inner surface 54 of the flex spline 26, thereby reducing the friction between the wave generator 70 and the flex spline 26 as compared with the first embodiment. The reduced friction lowers the torque required to rotate the input shaft 24.

Referring to FIGS. 12 through 15, in a fourth embodiment of the invention, the disc recliner 18 includes a wave generator 90 that is a disc-shaped cam having an outer profile with three lobes 92 generally equally spaced apart in the circumferential direction. Thus, each lobe 92 is spaced approximately one hundred and twenty (120) degrees apart from each adjacent lobe 92. The wave generator 90 includes a pair of rollers 94 flanking each lobe 92 in the circumferential direction such that there is a total of six (6) rollers 94 in the current embodiment. Each roller 94 is disposed in a recess 96 formed in the outer profile of the wave generator 90. More specifically, each roller 94 includes spaced apart first and second wheels 98, 100 mounted on opposite ends of a spacer or shaft 102 that extends in the axial direction. The first and second wheels 98, 100 are disposed within reliefs 104 formed on each side of the wave generator 90 and the shaft 102 is rotatably supported in the recess 96 by the wave generator 90. The axis of each shaft 102 is generally parallel with the pivot axis 20. The lobes 92 and the rollers 94 contact the inner surface 54 of the flex spline 26. As the wave generator 90 rotates, the lobes 92 are in sliding contact with the inner surface 54 of the flex spline 26 and the rollers 94 are in rolling contact with the inner surface 54 of the flex spline 26, thereby reducing the friction between the wave generator 90 and the flex spline 26 while also ensuring the teeth 52 on the flex spline 26 remain meshingly engaged with the teeth 40, 48 on the fixed and rotatable plates 22, 30.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner operatively coupling a seat back to a seat cushion to allow selective pivotal movement of the seat back relative to the seat cushion about a pivot axis extending in an axial direction, said disc recliner comprising:
   a first plate adapted to be fixedly secured to the seat cushion, said first plate including a first plurality of teeth disposed therearound;
   a second plate adapted to be fixedly secured to the seat back and rotatably coupled to said first plate, said second plate including a second plurality of teeth disposed therearound, wherein a tooth count of said first plurality of teeth does not equal a tooth count of said second plurality of teeth;

a flex spline including a flexible wall defining an inner surface and having a third plurality of teeth disposed radially therearound, wherein a tooth count of said third plurality of teeth equals said tooth count of said first plurality of teeth;

a wave generator having a first side facing said first plate and a second side facing said second plate and an outer profile defining a circumferential outer edge for causing a portion of said third plurality of teeth to meshingly engage with said first plurality of teeth and said second plurality of teeth, said wave generator including a plurality of spaced apart recesses formed in said outer profile extending axially between said first and second sides; and a roller rotatably supported in each of said recesses along said outer profile of said wave generator, said rollers rotating about an axis generally parallel to the pivot axis and at least one of said rollers directly contacting said inner surface of said flex spline during rotation of said wave generator, wherein said second plate rotates relative to said first plate in response to rotation of said wave generator, thereby causing pivotal movement of the seat back relative to the seat cushion.

2. The disc recliner as set forth in claim 1 wherein said outer profile of said wave generator includes a plurality of lobes generally equally spaced apart in a circumferential direction, said plurality of lobes causing said third plurality of teeth to meshingly engage with said first plurality of teeth and said second plurality of teeth in a plurality of distinct regions corresponding with said plurality of lobes.

3. The disc recliner as set forth in claim 2 wherein said plurality of distinct regions at which said third plurality of teeth meshingly engage with said first plurality of teeth and said second plurality of teeth change in response to rotation of said wave generator.

4. The disc recliner as set forth in claim 3 wherein said third plurality of teeth urge said second plurality of teeth to align with said first plurality of teeth in said plurality of distinct regions in response to rotation of said wave generator, thereby causing rotation of said second plate.

5. The disc recliner as set forth in claim 4 wherein said flex spline does not rotate relative to said first plate in response to rotation of said wave generator.

6. The disc recliner as set forth in claim 5 wherein said first plate is circular and said first plurality of teeth extend radially inward toward the pivot axis, and wherein said second plate is circular and said second plurality of teeth extend radially inward toward the pivot axis, and wherein said flex spline is circular and said third plurality of teeth extend radially outward away from the pivot axis.

7. The disc recliner as set forth in claim 6 wherein said tooth count of said first plurality of teeth and said tooth count of said second plurality of teeth differ by three teeth.

8. The disc recliner as set forth in claim 7 wherein said outer profile of said wave generator includes three lobes generally equally spaced apart in said circumferential direction, said lobes causing said third plurality of teeth to meshingly engage with said first plurality of teeth and said second plurality of teeth in three distinct regions corresponding with said lobes.

9. The disc recliner as set forth in claim 8 wherein said flex spline is disposed in the axial direction between said first plate and said second plate.

10. The disc recliner as set forth in claim 9 including an input shaft coaxial with the pivot axis, said input shaft coupled with said wave generator for rotating said wave generator about the pivot axis.

\* \* \* \* \*